(12) United States Patent
Minamimoto et al.

(10) Patent No.: US 6,839,518 B1
(45) Date of Patent: Jan. 4, 2005

(54) LEVEL ADJUSTMENT METHOD AND WAVELENGTH DIVISION MULTIPLEXING DEVICE AND SYSTEM

(75) Inventors: Kazuhiro Minamimoto, Kawasaki (JP); Akihisa Kawaguchi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 437 days.

(21) Appl. No.: 09/695,088

(22) Filed: Oct. 25, 2000

(30) Foreign Application Priority Data

Dec. 24, 1999 (JP) .................................. 11-368470

(51) Int. Cl.$^7$ ........................ H04B 10/00; H04B 10/08; H04B 10/04; H04J 14/02
(52) U.S. Cl. ........................ 398/94; 398/160; 398/197; 398/34
(58) Field of Search .................. 398/33, 34, 37, 398/38, 91, 93, 94, 160, 197, 26, 177, 175, 79, 82, 162, 195, 209; 359/337.12, 337.5, 341.41, 341.42

(56) References Cited

U.S. PATENT DOCUMENTS

| | | | | |
|---|---|---|---|---|
| 5,894,362 A | * | 4/1999 | Onaka et al. ............... | 359/124 |
| 6,064,501 A | * | 5/2000 | Roberts et al. ............. | 359/110 |
| 6,094,296 A | * | 7/2000 | Kosaka .................. | 359/341.41 |
| 6,157,475 A | * | 12/2000 | Dugan et al. ............... | 359/110 |
| 6,271,945 B1 | * | 8/2001 | Terahara ................... | 359/124 |
| 6,359,726 B1 | * | 3/2002 | Onaka et al. ............. | 359/337.1 |
| 6,466,348 B1 | * | 10/2002 | Izumi .......................... | 359/177 |

FOREIGN PATENT DOCUMENTS

| | | |
|---|---|---|
| JP | 7-30520 | 1/1995 |
| JP | 8-321824 | 12/1996 |
| JP | 9-224016 | 8/1997 |
| JP | 9-261205 | 10/1997 |

* cited by examiner

*Primary Examiner*—Jason Chan
*Assistant Examiner*—Dalzid Singh
(74) *Attorney, Agent, or Firm*—Staas & Halsey LLP

(57) ABSTRACT

A WDM transmission device includes a level adjustment unit adjusting levels of optical signals having different wavelengths, a multiplexer multiplexing the optical signals, an amplifier amplifying a multiplexed optical signal, and a monitor unit monitoring the multiplexed optical signal applied to the amplifier and a level of an output signal of the amplifier and controlling the level adjustment unit so that the levels of the optical signals fall within a predetermined level range in which the amplifier can operate normally.

9 Claims, 13 Drawing Sheets

| Pref : TARGET LEVEL |
| α : FINE QUANTITY |

| CH | WAVELENGTH | DECISION RESULT |
|---|---|---|
| 1 | λ1 | NOT CONVERGE |
| 2 | λ2 | CONVERGE |
| 3 | λ3 | CONVERGE |
| 4 | λ4 | NOT CONVERGE |

| case | DECISION RESULT |
|---|---|
| A | REACH UPPER LIMIT |
| B | NOT YET REACH UPPER LIMIT |

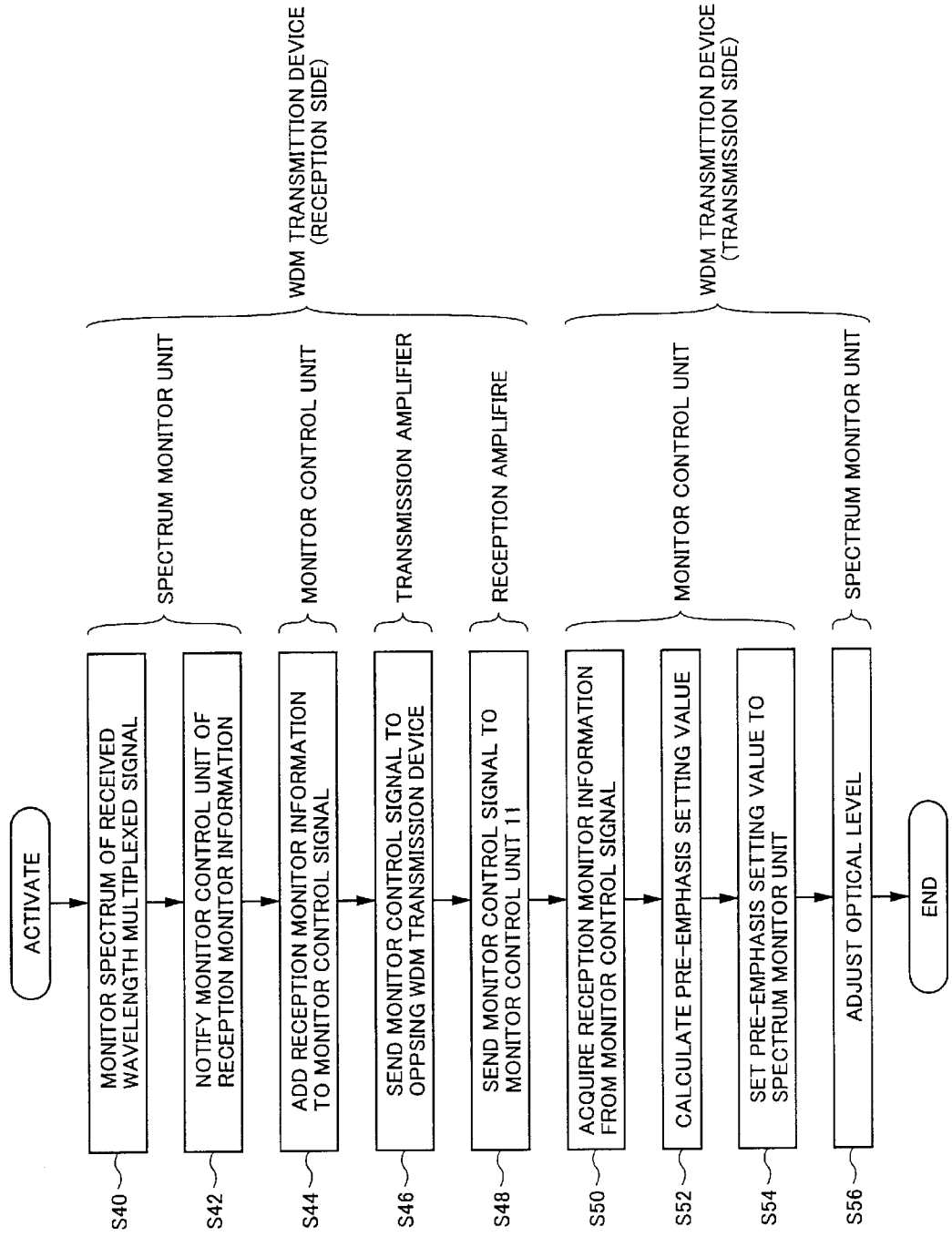

LEVEL ADJUSTMENT METHOD AND WAVELENGTH DIVISION MULTIPLEXING DEVICE AND SYSTEM

BACKGROUND OF THE INVENTION

1. Field of the Invention

The present invention generally relates to a level adjustment method and a wavelength division multiplexing device and system. More particularly, the present invention is concerned with a level adjustment method for adjusting the level of an input signal, and a device and a system using such a method.

Recently, as a rapid increase in a demand for communications due to advance of intelligent societies, many communication channels have been newly installed. However, installation of optical fiber cables costs a great deal. Thus, it is requirement to efficiently utilize the existing optical fiber cables. Wavelength division multiplexing (WDM) is the main current in the development of efficient utilization of the existing cables and increase in the aggregate number of channels per fiber.

2. The description of the Related Art

FIG. 1 is a block diagram of a communication system using WDM transmission devices. The communication system shown in FIG. 1 includes WDM transmission devices 1a and 1b. Transmission devices 2a-1 through 2a-3 are connected to the WDM transmission device 1a, and transmission devices 2b-1 through 2b-3 are connected to the WDM transmission device 1b. A plurality of terminals 3a are connected to the transmission devices 2a-1 through 2a-3, and a plurality of terminals 3b are connected to the transmission devices 2b-1 through 2b-3. Each of the transmission devices 2a-1 through 2a-3 multiplexes signals from the terminals 3a by time-division multiplexing. Similarly, each of the transmission devices 2b-1 through 2b-3 multiplexes signals from the terminals 3b by time-division multiplexing.

The transmission devices 2a-1 through 2a-3 send multiplexed optical signals respectively having different wavelengths $\lambda 1$, $\lambda 2$ and $\lambda 3$ to the WDM transmission device 1a. Similarly, the transmission devices 2b-1 through 2b-3 send multiplexed optical signals respectively having different wavelengths $\lambda 1$, $\lambda 2$ and $\lambda 3$ to the WDM transmission device 1b. A repeater device 4 is provided between the WDM transmission devices 1a and 1b. The repeater device 4 may be omitted when the WDM transmission devices 1a and 1b are close to each other so that there is no need to repeat the optical signals transmitted therebetween.

The WDM transmission device 1a multiplexes the optical signals of the wavelengths $\lambda 1$, $\lambda 2$ and $\lambda 3$, and sends the multiplexed optical signal thus obtained to the opposing the WDM transmission device 1b via the repeater 4. The WDM transmission device 1b demultiplexes the received optical signal into optical signals of the wavelengths $\lambda 1$, $\lambda 2$ and $\lambda 3$, which are then supplied to the transmission devices 2b-1, 2b-2 and 2b-3, respectively. The transmission devices 2b-1 through 2b-3 separate the received signals by time-division multiplexing, the individual signals thus obtained being supplied to the terminals 3b.

FIG. 2 is a block diagram of a WDM transmission device 10, which corresponds to the WDM transmission device 1a or 1b shown in FIG. 1. The WDM transmission device 10 is made up of a transmission unit and a reception unit. The optical signals of the wavelengths $\lambda 1$, $\lambda 2$ and $\lambda 3$ are applied to the transmission unit of the WDM transmission device 10 via optical variable attenuators 20-1 through 20-3 provided outside of the device 10. The transmission unit includes a wavelength multiplexer 12 and an amplifier 14 for transmission. The wavelength multiplexer 12 multiplexes the optical signals of the wavelengths $\lambda 1$, $\lambda 2$ and $\lambda 3$ respectively coming from the attenuators 20-1 through 20-3, and outputs the multiplexed optical signal to the amplifier 14. Then, the amplifier 14 amplifies the optical signal, and outputs the amplified optical signal to an optical transmission path (optical fiber). The wavelength multiplexer 12 includes, for example, a WDM coupler utilizing a grating or the like.

An optical signal transmitted over the wavelength-multiplexed optical signal is applied to a reception unit of the WDM transmission device 10. The reception unit includes an amplifier 18 for reception, and a wavelength demultiplexer 16. The amplifier 18 amplifies the received optical signal, the amplified signal being applied to the wavelength demultiplexer 16. Then, the wavelength demultiplexer 16 demultiplexes the received optical signal into optical signals of the wavelengths $\lambda 1$, $\lambda 2$ and $\lambda 3$, which are then supplied to, for example, the transmission devices 2a-1 through 2a-3 shown in FIG. 1.

A factor used to evaluate the quality of transmission in the system including the WDM transmission device 10 is an optical signal-to-noise ratio (OSNR). It is desired that the OSNR is high and uniform to the optical signals of the wavelengths $\lambda 1$, $\lambda 2$ and $\lambda 3$ on the receive side.

FIG. 3 shows spectra of lights that are input and output signals of the WDM transmission device 10. In FIG. 3, only four wavelengths are illustrated for the sake of simplicity. However, the number of wavelengths is not limited to four.

Part (A) of FIG. 3 shows a spectrum of light that is the output signal of the amplifier 14 for transmission shown in FIG. 2. The four peaks of the wavelengths $\lambda 1$–$\lambda 4$ have been subjected to a level adjustment, and have almost equal peak levels. The optical signals exhibiting the spectrum shown in part (A) of FIG. 3 are transmitted over the optical fiber. In this case, the output signal of the amplifier 18 for reception shown in FIG. 2 has a spectrum of light as shown in part (B) of FIG. 3. A gentle envelope having a mountain shape is a spectrum of an amplified spontaneous emission light (ASE light) accumulated in the optical signal due to amplifiers on the transmission path. Four sharp peaks of light shown in part (B) of FIG. 3 have the wavelengths $\lambda 1$–$\lambda 4$. It is to be noted that the four peaks shown in part (B) have different levels. It will be noted that an ASE light introduced in the amplifier 14 is neglected in the illustration of part (A) of FIG. 3.

The OSNR corresponds to the difference between the peak level of the optical spectrum and the level of the ASE light. For example, as shown in part (B) of FIG. 3, the OSNR of the optical spectrum of the wavelength $\lambda 4$ is indicated by an arrow 22.

Thus, as shown in part (A) of FIG. 3, even if the amounts of attenuation by the optical variable attenuators 20-1 through 20-3 are varied so that the lights of the wavelengths $\lambda 1$–$\lambda 4$ have a constant level, the OSNRs of the wavelengths $\lambda 1$–$\lambda 4$ are not constant. This is due to the following. First, the ASE light is accumulated in the light each time the light passes through the amplifier or the like. Second, the gain of each amplifier has a wavelength dependence. Third, the optical fiber has a loss of wavelength dependence.

The levels of the optical variable attenuators 20-1 through 20-3 shown in FIG. 2 are adjusted taking into consideration the above factors. This adjustment on the transmission side is called pre-emphasis control.

FIG. 4 is a block diagram of a WDM transmission device 30 having a different configuration as that of the WDM transmission device 10. The WDM transmission device 30 includes, in the transmission unit, variable attenuators 36-1 through 36-3, the wavelength multiplexer 12, the amplifier 14 for transmission, an optical coupler 32, and a spectrum monitor unit 34. The reception unit of the WDM transmission device 30 is the same as that of the device 10 shown in FIG. 2.

Lights of the wavelengths λ1, λ2 and λ3 pass through the variable attenuators 36-1 through 36-3 of the WDM transmission device 10, and are applied to the wavelength multiplexer 12. Then, the multiplexer 12 multiplexes the wavelengths λ1, λ2 and λ3 of the optical signals, and outputs the multiplexed optical signal to the transmission amplifier 14. Then, the amplifier 14 amplifies the received signal, the amplified optical signal being output to the optical fiber via the coupler 32.

The coupler 32 outputs a part of the optical signal from the amplifier 14 to the spectrum monitor unit 34, which may be formed by a spectrum analyzer. The spectrum monitor unit 34 defines target levels with regard to the optical signals of the wavelengths λ1, λ2 and λ3. The spectrum monitor unit 34 measures the wavelengths, levels and OSNR of the light components contacted in the branch light coming from the coupler 32.

The spectrum monitor unit 34 supplies the variable attenuators 36-1 through 36-3 with respective control signals, which control the levels of the respective optical signals on the basis of the results of the measurement in a feedback fashion. For example, the monitored level of the light of the wavelength λ1 is higher than the corresponding target level, the spectrum monitor unit 34 supplies the variable attenuator 36-1 with the control signal which controls the amount of attenuation thereof so that the monitored level reduces.

However, the WDM transmission device 10 shown in FIG. 2 has a disadvantage in that there is no way other than actual measurement of dispersion of the losses of the optical signals having the different wavelengths in the communication system. More particularly, the amounts of attenuation of the variable attenuators 20-1 through 20-3 are manually changed to adjust the differences among the losses of the optical signals. Thus, it takes a long time to perform initial installation, operation and maintenance of the system. Further, the WDM transmission device 10 does not have any means for coping with age deterioration and seasonal variation in performance.

The WDM transmission device 30 shown in FIG. 4 has the performance that depends on the required transmission distance. Thus, the device 30 is required to have the amplifier 14 of a type suitable for the situation in which the device 30 is used. The dynamic range of the amplifier 14 may vary. In the case where the variable attenuators 36-1 through 36-3 are feedback-controlled by the results of measurement by the spectrum monitor unit 34, the level of the input signal applied to the amplifier 14 may go beyond the dynamic range thereof.

Further, in order to maintain the OSNR at an appropriate level on the reception side, it is desirable that the optical signals of the different wavelengths have levels as high as possible. In this regard, the manual adjustment of the variable attenuators 20-1 through 20-3 of the WDM transmission device 10 shown in FIG. 2 is cumbersome and inefficient. In the WDM transmission device 30, the level of the input signal applied to the amplifier 14 may exceed the dynamic range thereof although the feedback control of the variable attenuators 36-1 through 36-3 enables the levels of the optical signals to be maintained as high as possible.

SUMMARY OF THE INVENTION

It is a general object of the present invention to eliminate the above disadvantages of the related art.

A more specific object of the present invention is to provide a level adjustment method and a wavelength division multiplexing device and system capable of efficiently adjusting the levels of the input signals of different wavelengths while taking into account the dynamic range of an amplifier.

The above objects of the present invention are achieved by A WDM (Wavelength Division Multiplexing) transmission device comprising: a level adjustment unit adjusting levels of optical signals having different wavelengths; a multiplexer multiplexing the optical signals; an amplifier amplifying a multiplexed optical signal; and a monitor unit monitoring the multiplexed optical signal applied to the amplifier and a level of an output signal of the amplifier and controlling the level adjustment unit so that the levels of the optical signals fall within a predetermined level range in which the amplifier can operate normally.

The above objects of the present invention are also achieved by a system comprising a plurality of wavelength division multiplexing (WDM) transmission devices, and an optical fiber cable connecting the WDM transmission devices. Each of the WDM transmission devices is configured as described above.

The above objects of the present invention are also achieved by a level adjustment method comprising the steps of: adjusting levels of optical signals having different wavelengths; multiplexing the optical signals; amplifying a multiplexed optical signal: and monitoring the multiplexed optical signal applied to the amplifier and a level of an output signal of the amplifier and controlling the level adjustment unit so that the levels of the optical signals fall within a predetermined level range in which the amplifier can operate normally.

BRIEF DESCRIPTION OF THE DRAWINGS

Other objects, features and advantages of the present invention will become more apparent from the following detailed description when read in conjunction with the accompanying drawings, in which:

FIG. 13 is a flowchart of a process sequence of the system shown in FIG. 11.

DESCRIPTION OF THE PREFERRED EMBODIMENTS

Figure 1:
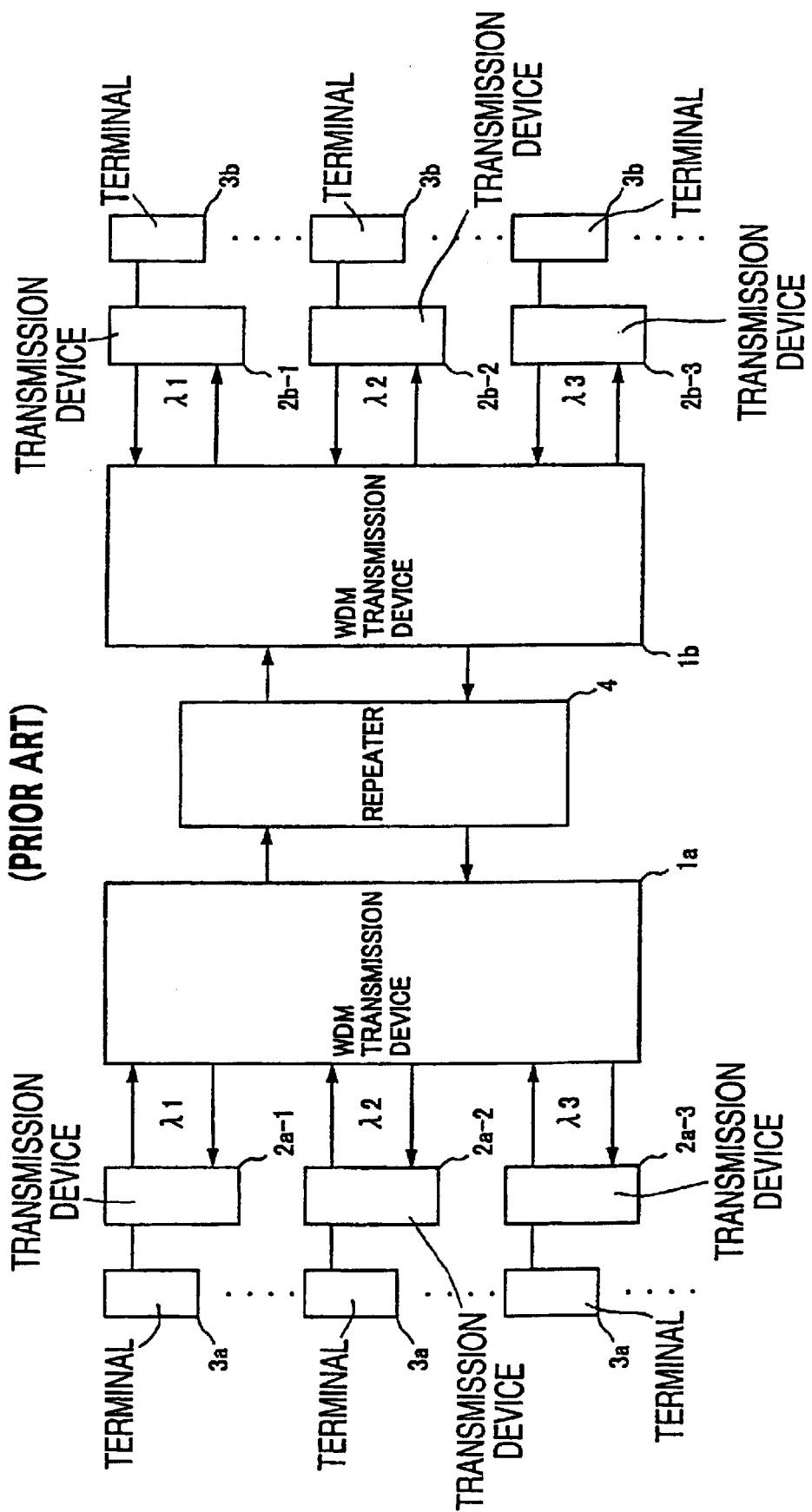
FIG. 1 is a block diagram of a communication system using WDM transmission devices.
Figure 2:
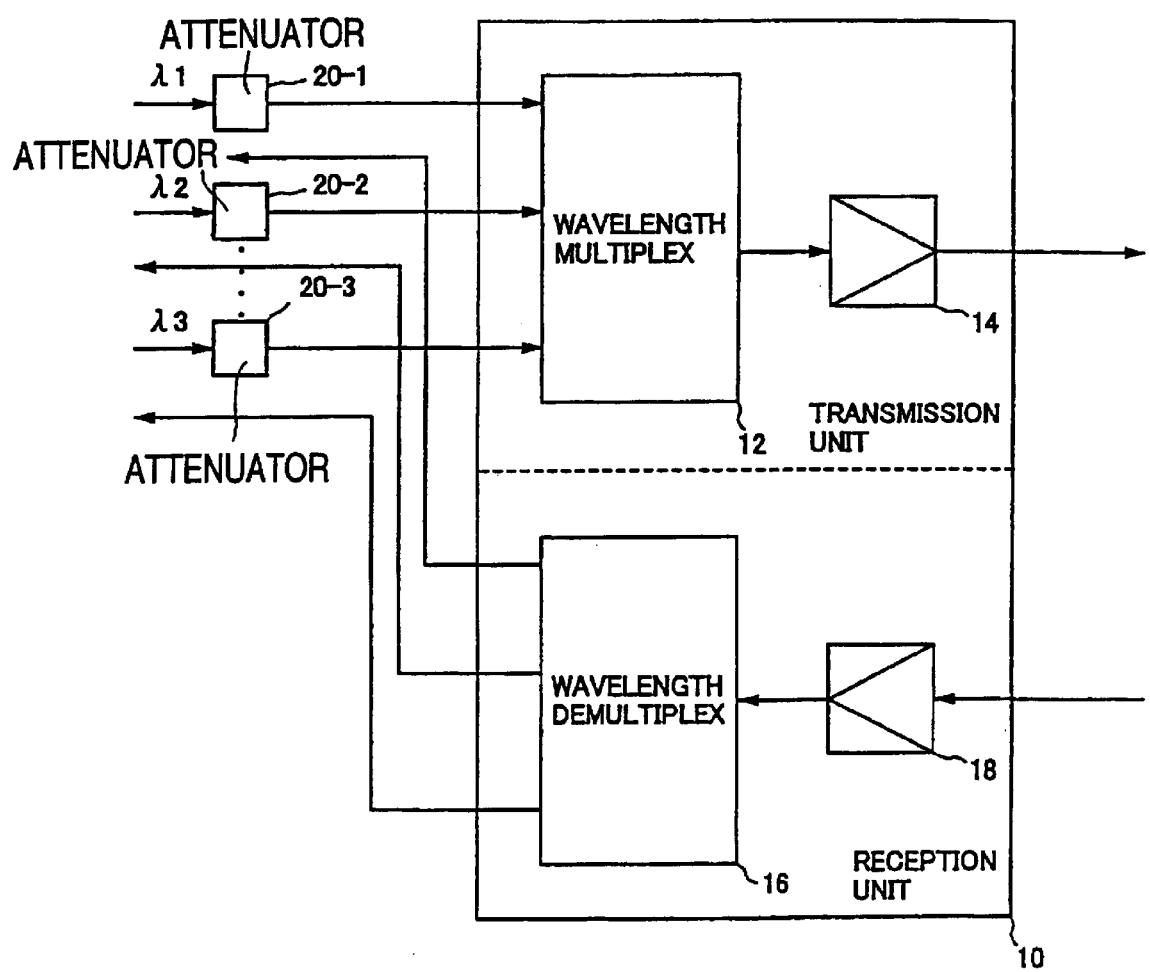
FIG. 2 is a block diagram of a configuration of a WDM transmission device.
Figure 3:
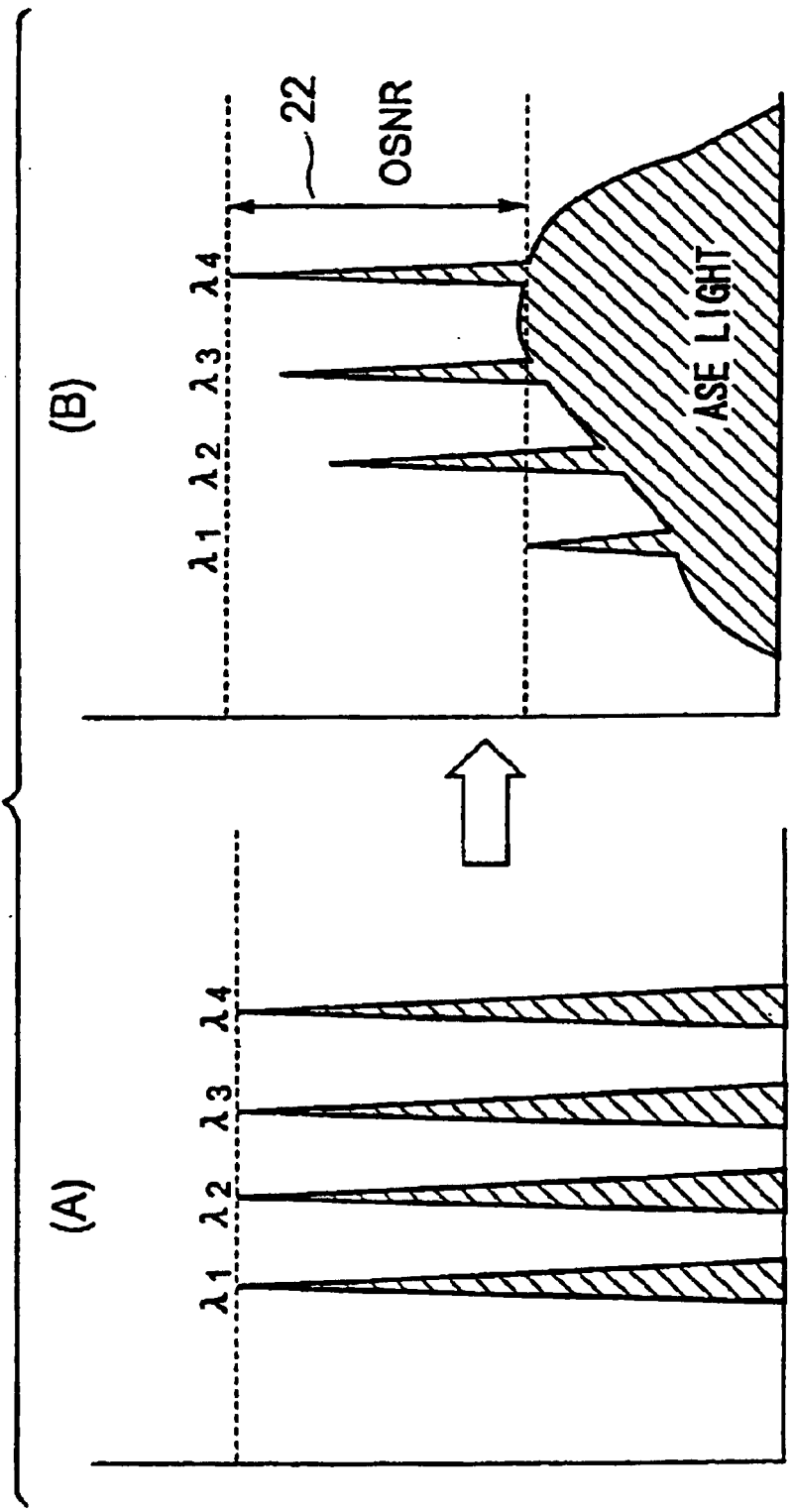
FIG. 3 is a spectrum diagram of input and output signals of the WDM transmission device.
Figure 4:
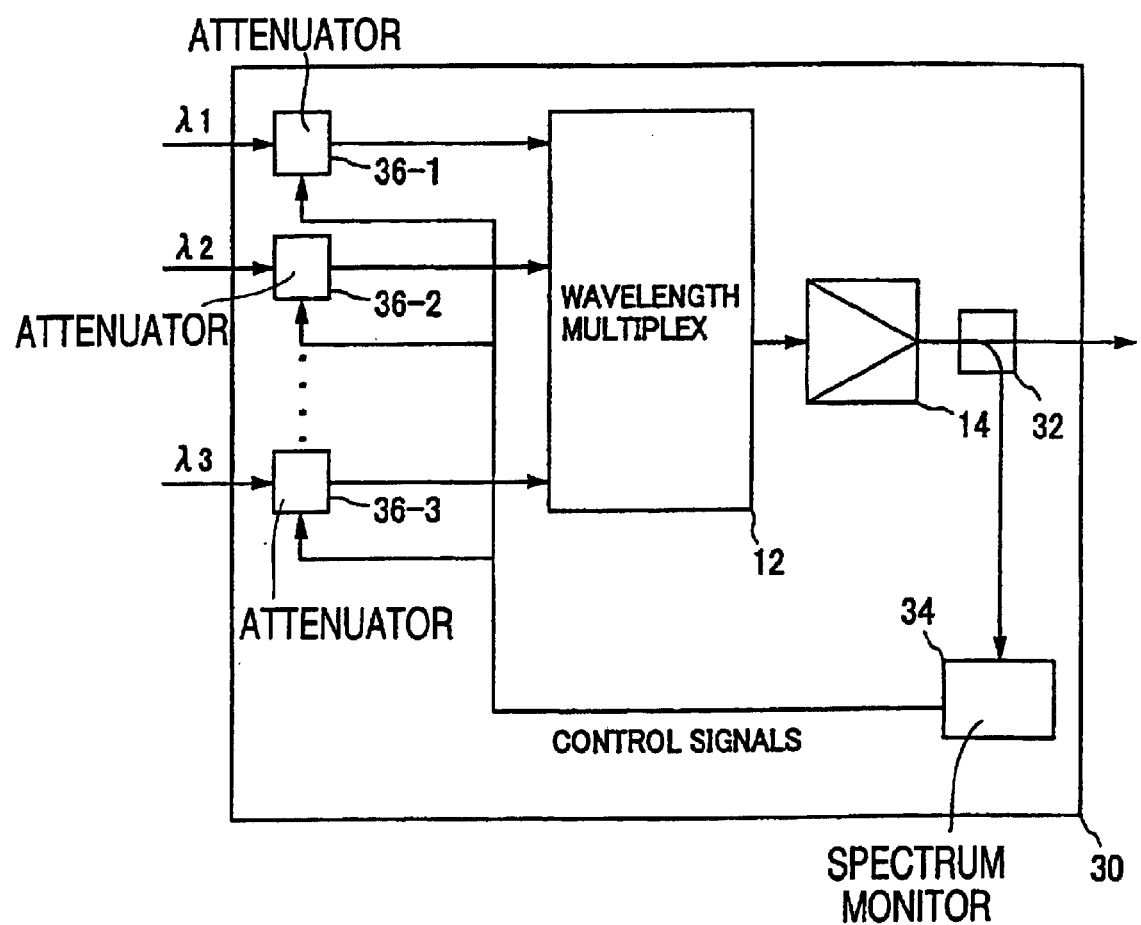
FIG. 4 is a block diagram of another configuration of the WDM transmission device.
Figure 5:
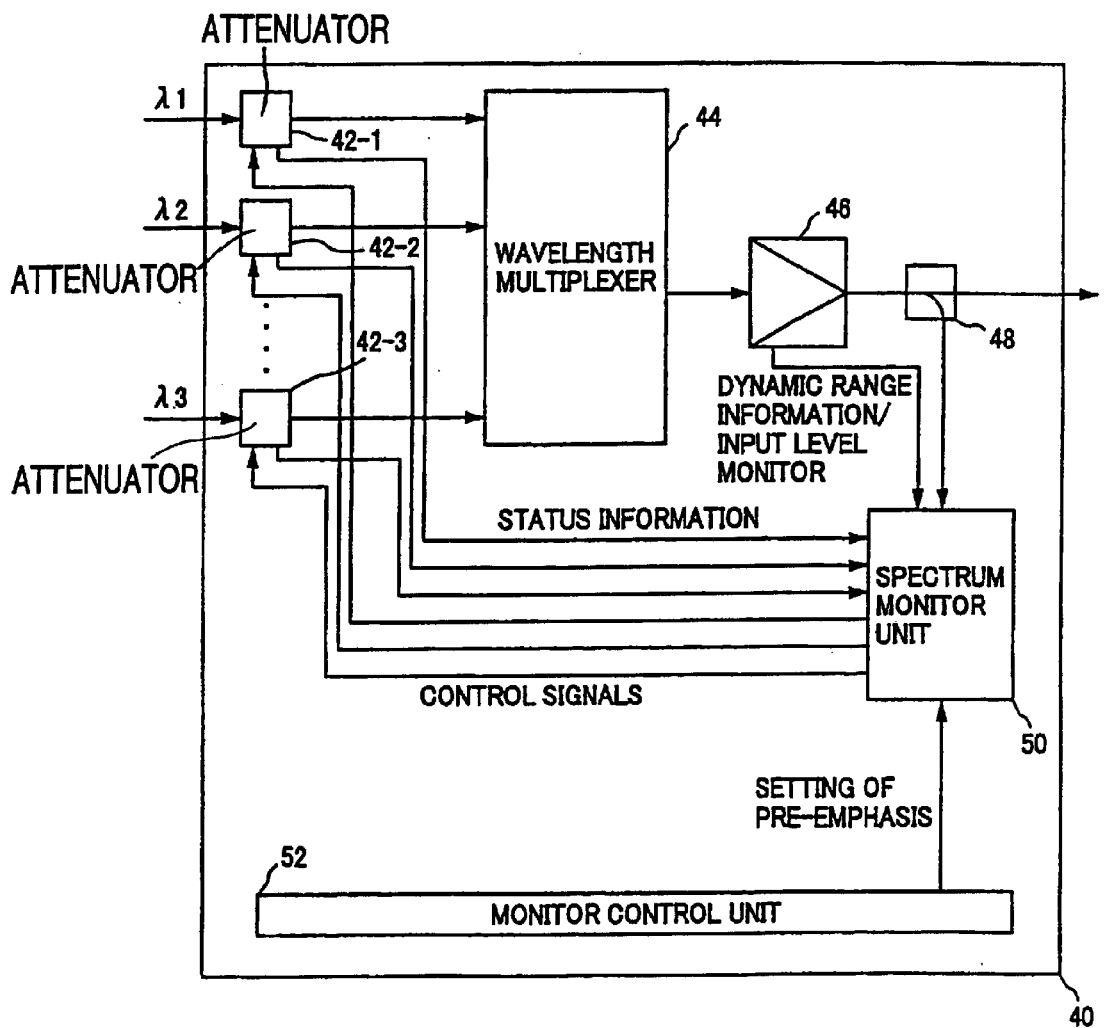
FIG. 5 is a block diagram of a WDM transmission device according to a first embodiment of the present invention.

FIG. 5 is a block diagram of a WDM transmission device according to a first embodiment of the present invention.

A WDM transmission device 40 shown in FIG. 5 includes variable attenuators 42-1 through 42-3, a wavelength multiplexer 44, an amplifier 46 for transmission, a photocoupler 48, a spectrum monitor unit 50, and a monitor control unit 52.

Figure 6:
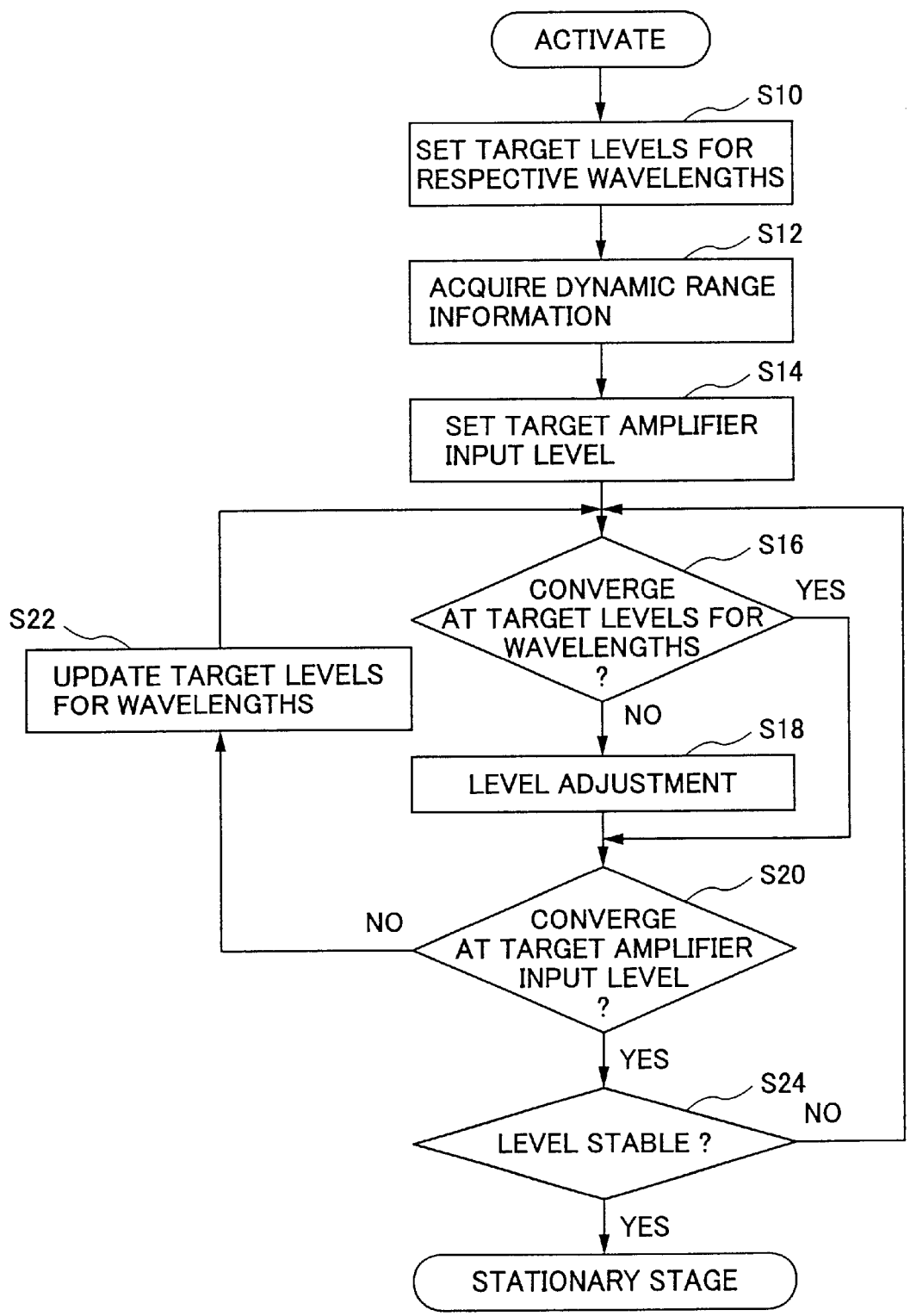
FIG. 6 is a flowchart of a process sequence of the WDM transmission device.

A process sequence of the WDM transmission device 30 will be described by referring to a flowchart shown in FIG. 6. After the WDM transmission device 30 is activated, the spectrum monitor unit 50 sets the provisional target levels of the optical signals at step S10. At step S12, the spectrum monitor unit 50 is supplied with information concerning the dynamic range of the transmission amplifier 46, this information indicating a range of the input signal level within which the transmission amplifier 46 operates normally. Hereinafter, the above information will be referred to as dynamic range information.

At step S14, the spectrum monitor unit 50 reads information indicative of the upper and lower limits of the input signal level contained in the dynamic range information, and computes the target input level of the transmission amplifier 46 by using the following formula:

(target input level)=[(upper limit level)−(lower limit level)]×α+(lower limit level)   (1)

where 0<α<1.

At step S16, the spectrum monitor unit 50 compares the provisional target input levels of the optical signals tentatively selected with the levels of the optical signals included in the branch light from the photocoupler 48, and determines whether the optical signals converge at the respective target levels.

If it is determined that the optical signals do not converge at the respective target levels (NO at step S16), at step S18 the spectrum monitor unit 50 supplies the variable attenuators 42-1 through 42-3 with control signals that control the levels of the respective optical signals on the basis of the results of comparison carried out at step S16. More particularly, if the level of the optical signal having the wavelength λ1 is lower than the corresponding target level, the spectrum monitor unit 50 supplies the variable attenuator 42-1 with the control signal that acts to reduce the amount of attenuation of the variable attenuator 42-1. By the manner mentioned above, the levels of the optical signals are adjusted so as to become equal to the respective target levels. The target levels for the optical signals of different wavelengths may be identical to or different from each other taking into consideration the setting of pre-emphasis. Then, the process proceeds with step S20.

Step S20 is also executed if it is determined that optical signals converge at the respective target levels (YES at step S16). At step S20, the spectrum monitor unit 50 compares the input level of the transmission amplifier 46 with the target amplifier input level, and determines whether the input level of the amplifier 46 is settled at the target amplifier input level.

If it is determined that the input level of the transmission amplifier 46 is settled at the target amplifier input level (YES at step S20), the spectrum monitor unit 50 executes step S24. If not (NO at step S20), the unit 50 executes step S22.

At step S22, the spectrum monitor unit 50 updates the target levels for the respective optical signals on the basis of the results of comparison carried out at step S20. More particularly, if the input level of the amplifier 46 is lower than the target amplifier input level, the spectrum monitor unit 50 raises the target levels for the optical signals. In contrast, if the input level of the amplifier 46 is higher than the target amplifier input level, the spectrum monitor unit 50 lowers the target levels. Then, the spectrum monitor unit 50 executes step S16.

When the input level of the transmission amplifier 46 is settled at the target amplifier input level, the spectrum monitor unit 50 monitors the stability of the levels of the optical signals and the stability of the multiplexed optical signal applied to the transmission amplifier 46 for a given time. More particularly, the spectrum monitor unit 50 checks whether the levels of the optical signals are constantly at the respective target levels. Further, the spectrum monitor unit 50 checks whether the input level of the transmission amplifier 46 is constantly at the target amplifier input level.

If the stability of the individual optical signals and the stability of the optical signal applied to the transmission amplifier 46 are confirmed at step S24, the spectrum monitor unit 50 shifts to the stationary state. In contrast, if not at step S24, the spectrum monitor unit 50 returns to step S16. Even in the stationary state, the spectrum monitor unit 50 constantly executes steps S16-S20 and stores information thus obtained.

Figures 7A, 7B:
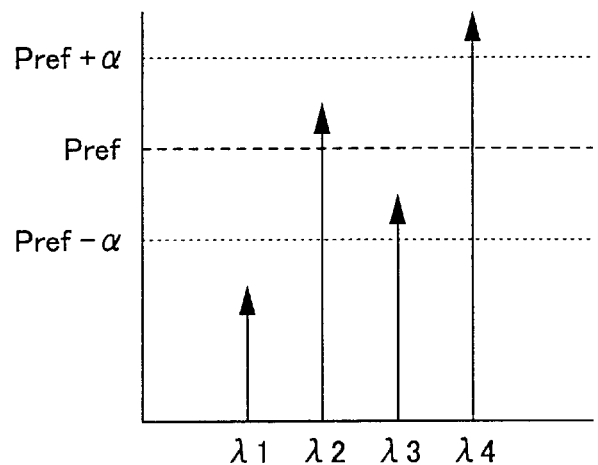
FIGS. 7A and 7B are diagrams of a decision on level convergence.

A description will be given, with reference to FIGS. 7A and 7B, of a decision on convergence made at step S16. The horizontal axis of a graph of FIG. 7A denotes the wavelength and the vertical axis thereof denotes the level. A tolerable range defined by ±a (a is a fine quantity) is defined with respect to the target level Pref. If the level of the optical signal on which a decision should be made falls within the range Pref ±α, the optical signal is acknowledged to be settled at the target level. In the case shown in FIG. 7A, the optical signals of the wavelengths λ2 and λ3 are acknowledged to be settled at the target level, and the optical signals of the wavelengths λ1 and λ4 are acknowledged not to be settled at the target level.

As described above, the WDM transmission device 40 can control the optical signals to have an appropriate level within the tolerable range and can adjust dispersion of the losses of the optical signals. The principle of the convergence decision shown in FIGS. 7A and 7B can be applied to the decision made at step S20.

Figure 8:
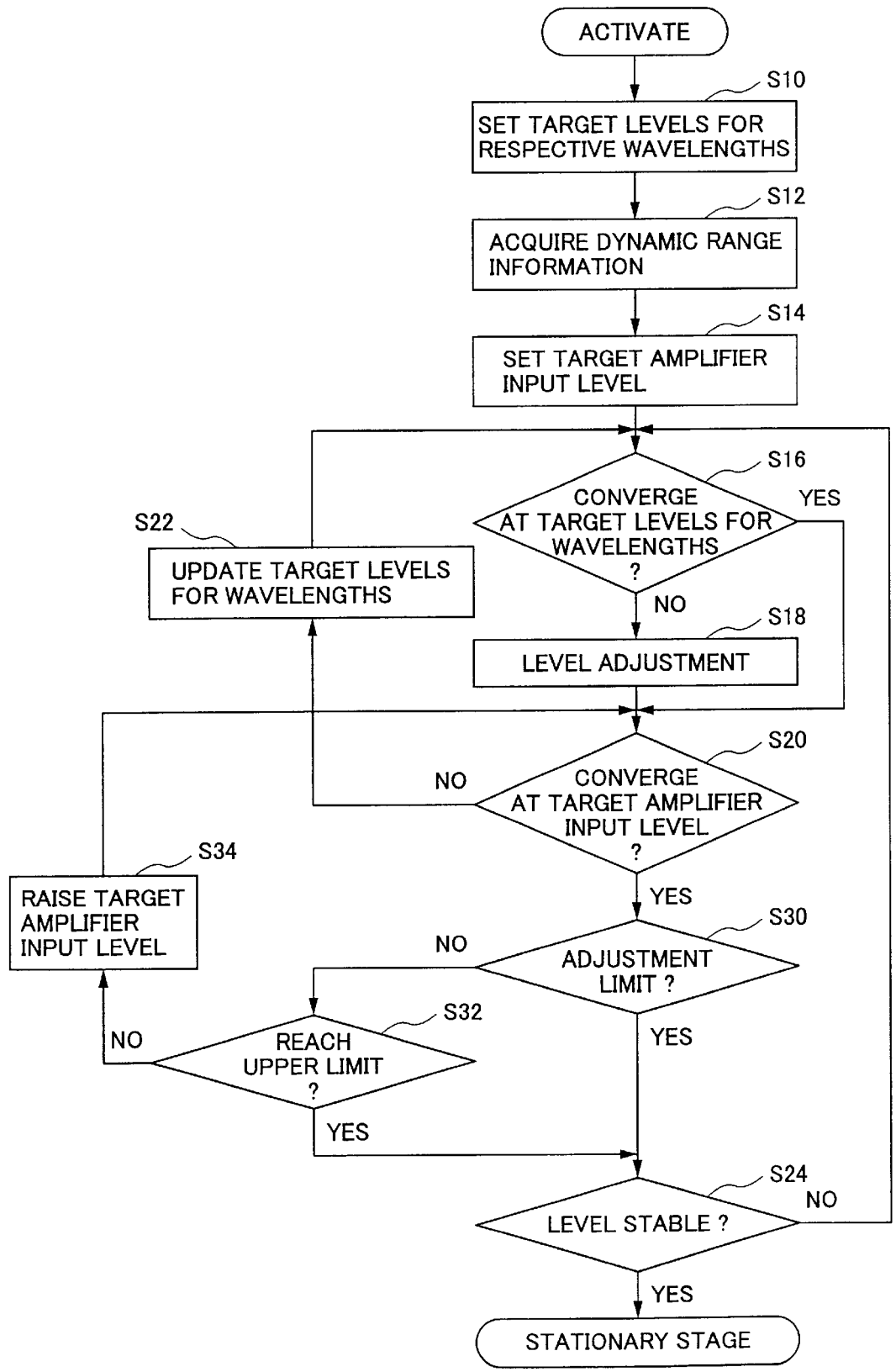
FIG. 8 is a flowchart of another process sequence of the WDM transmission device.

FIG. 8 is a flowchart of another process sequence of the WDM transmission device 40. In FIG. 8, steps that are the same as those shown in FIG. 6 are given the same reference numbers as previously.

Referring to FIG. 8, after the sequence of steps S10–S20, the spectrum monitor unit 50 determines whether there is any variable attenuator among the variable attenuators 42-1 through 42-3 that has reached an adjustment limit by step S18 or S22. The spectrum monitor unit 50 has a management table in which information concerning a variable attenuator which has reached the adjustment limit is registered. The information in the management table is derived from status information concerning the variable attenuators 42-1 through 42-3 supplied therefrom.

Thus, the spectrum monitor unit 50 is capable of discriminating which variable attenuator has reached the adjustment limit by referring to the management table. If it is determined that there is any variable attenuator that has reached the adjustment limit (YES at step S30), the spectrum monitor unit 50 executes step S24. If not at step S30 (NO at step S30), the spectrum monitor unit 50 executes step S32.

At step S32, the spectrum monitor unit 50 determines whether the target amplifier input level has reached the upper limit of the dynamic range of the transmission amplifier 46. If the answer of step S32 is YES, the spectrum monitor unit 50 executes step S24. If the answer of step S32 is NO, the spectrum monitor unit 50 executes step S34.

At step S34, the spectrum monitor unit 50 increases the target amplifier input level by a given amount, and executes step S20. At a raised target amplifier input level by the sequence of steps S20, S30, S32 and S34, the optical signal applied to the transmission amplifier 46 does not converge at the target amplifier input level. In this case, the spectrum monitor unit 50 executes step S22 rather than step S20.

The spectrum monitor unit 50 executes step S24 if there is any variable attenuator among the variable attenuators 42-1 through 42-3 that has reaches the adjustment limit (YES at step S30) or if the target amplifier input level has reached the upper limit of the dynamic range (YES at step S32).

Figures 9A, 9B:
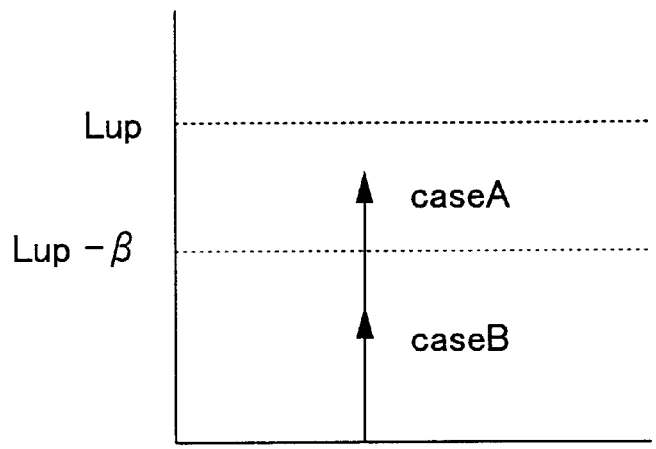
FIGS. 9A and 9B are diagrams of a level decision with respect to an upper limit.

A description will be given, with reference to FIGS. 9A and 9B, of the judgment at step S32. As shown in FIG. 9A, a fine quantity $-\beta$ is defined with regard to the upper limit Lup. If the level of the optical signal subjected to the judgment of step S32 falls within the range of Lup-$\beta$, it is judged that the optical signal has reached the upper limit. For example, an optical signal indicated as case A is acknowledged to have reached the upper limit, and an optical signal indicated as case B is acknowledged not to have reached the upper limit.

As described above, the WDM transmission device 40 can control the optical signal applied to the transmission amplifier 46 to be appropriately as high as possible within the dynamic range of the amplifier 46 and to adjust dispersion of the losses of the optical signals.

A description will be given of pre-emphasis control of the present invention WDM transmission device. The pre-emphasis control is intended to adjust the level of the optical signal on the transmission side taking into consideration accumulative introduction of the ASE light resulting from the amplifiers and the like on the transmission path, the level difference among the wavelengths due to the wavelength-dependence amplifying abilities of the amplifiers, and the level difference among the wavelengths due to the wavelength-dependence losses of the fibers.

Figure 10:
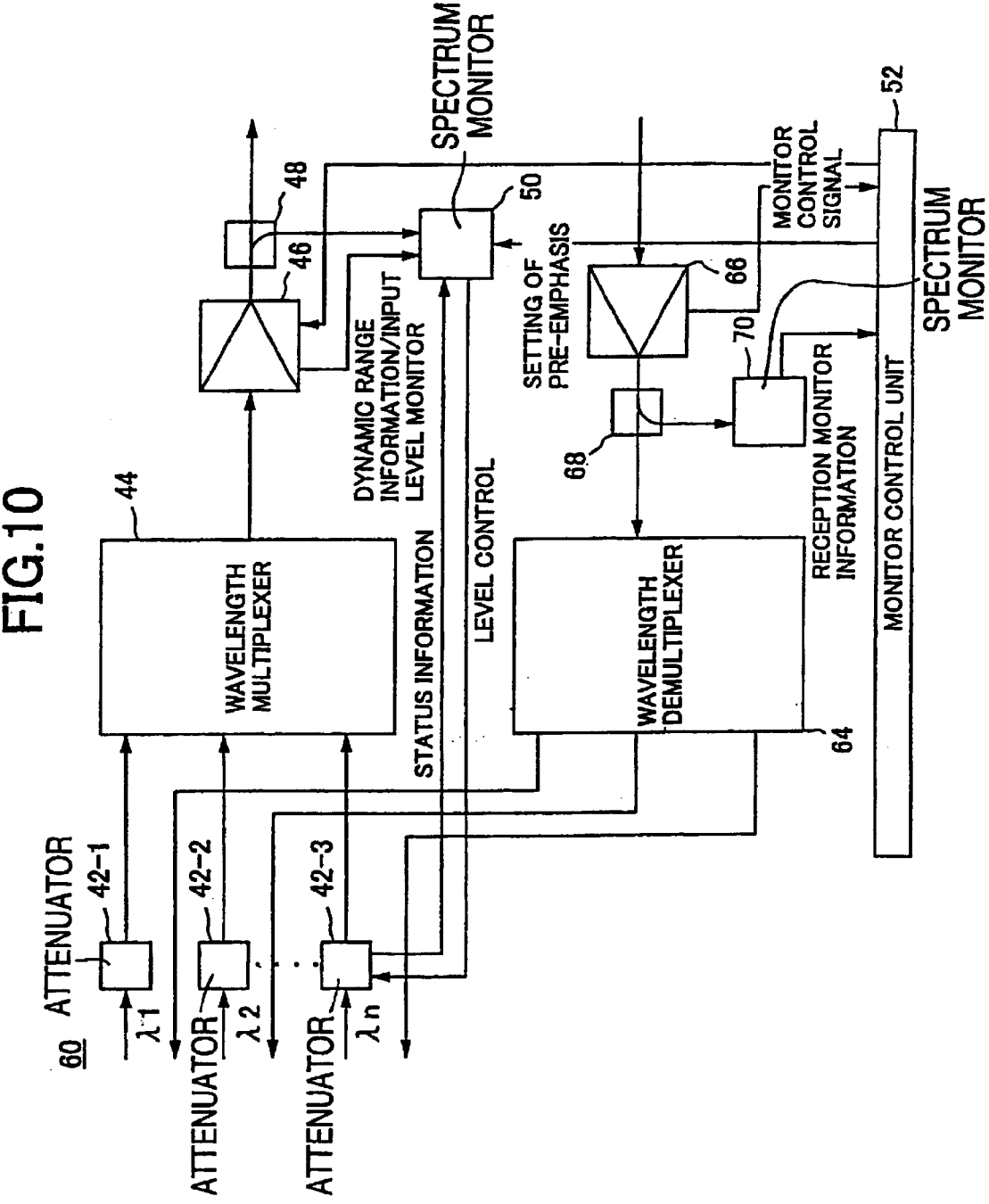
FIG. 10 is a block diagram of a WDM transmission device according to a second embodiment of the present invention.
Figure 11:
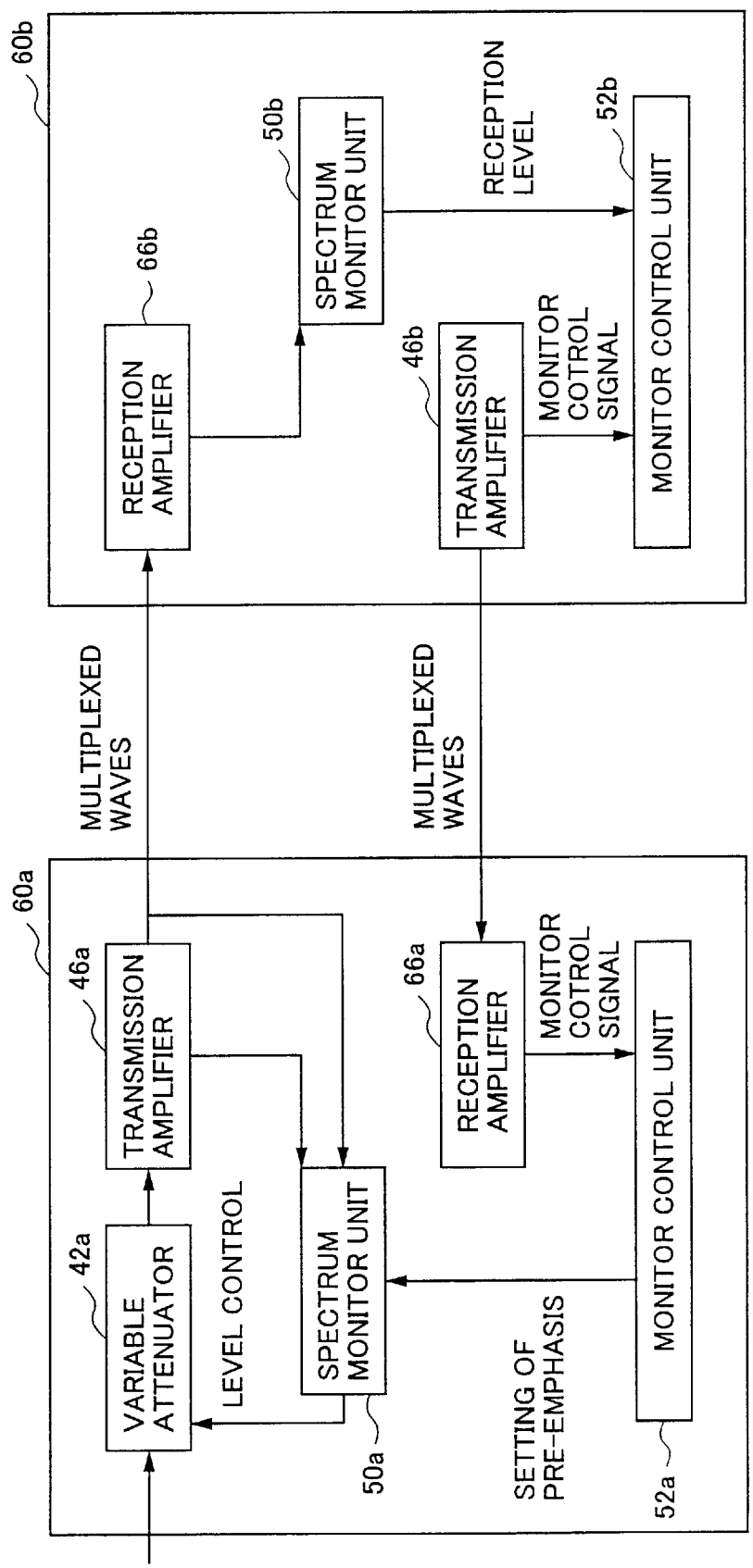
FIG. 11 is a block diagram of a system including WDM transmission devices.

FIG. 10 is a block diagram of a WDM transmission device according to a second embodiment of the present invention in which the pre-emphasis control is employed. In FIG. 10, any part shown therein that is the same as a part shown in FIG. 5 is denoted by the same reference numeral in both Figures. FIG. 11 is a block diagram of a system having two WDM transmission devices, each being configured as shown in FIG. 10.

A WDM transmission device 60 shown in FIG. 10 includes the variable attenuators 42-1 through 42-3, a transmission unit, and a reception unit. The transmission unit includes the wavelength multiplexer 44, the transmission amplifier 46, the photocoupler 48, and the spectrum monitor unit 50. The reception unit includes a wavelength demultiplexer 64, a reception amplifier 66, a photocoupler 68, and a spectrum monitor unit 70. Further, the WDM transmission device 60 includes the monitor control unit 52 provided in common to the transmission and reception units.

The spectrum monitor unit 50 performs the setting of pre-emphasis instructed by the monitor control unit 52 in addition to the aforementioned control operations thereof in the WDM transmission device 40 shown in FIG. 5. The setting of pre-emphasis will be described with reference to FIG. 12, which shows an example of the setting of pre-emphasis.

Figure 12:
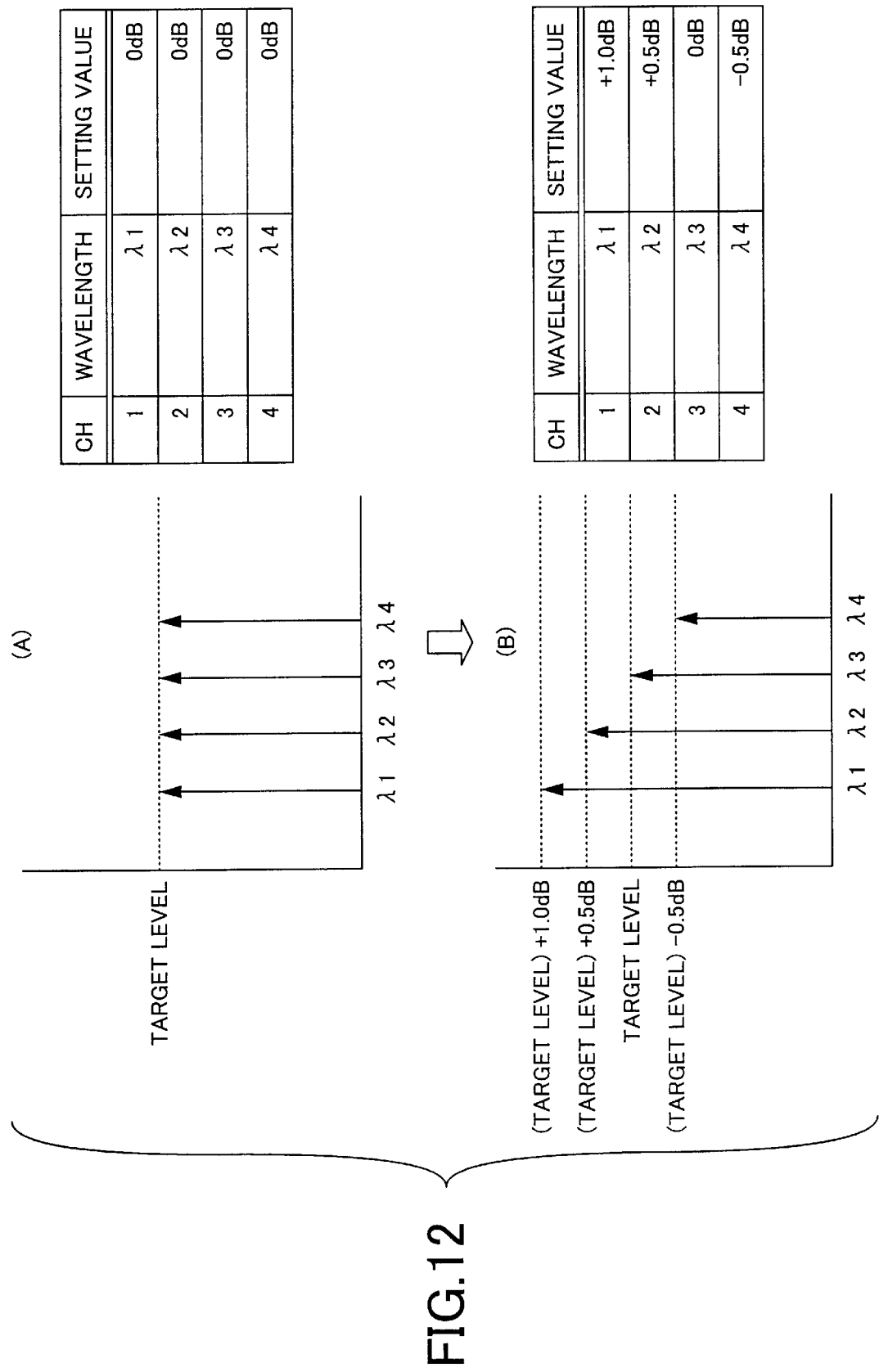
FIG. 12 is a diagram of a pre-emphasis control.

If the setting of pre-emphasis by the monitor control unit 52 is not performed, the spectrum monitor unit 50 adjusts the variable attenuators 42-1 through 42-3 so that the optical signals of the wavelengths $\lambda 1$–$\lambda 4$ output by the transmission amplifier 46 converge at the target level, as shown in part (A) of FIG. 12.

If the setting of pre-emphasis by the monitor control unit 52 is performed, the spectrum monitor unit 50 adjusts the variable attenuators 42-1 through 42-3 so that the optical signals of the wavelengths $\lambda 1$–$\lambda 4$ converge at the respective target levels, as shown in part (B) of FIG. 12. For example, the spectrum monitor unit 50 adjusts the variable attenuator 42-1 so that the optical signal of the wavelength $\lambda 1$ converges at [(target level)+1.0 dB].

The reception amplifier 66 receives the wavelength-multiplexed optical signal from the opposing WDM transmission device, and detects the monitor control signal therefrom. The monitor control signal is sent to the monitor control unit 52. A part of the optical signal from the photocoupler 68 is supplied to the spectrum monitor unit 70. The spectrum monitor unit 70 measures the wavelengths, levels and OSNRs of the optical signals contained in the branch light from the photocoupler 68. Then, the spectrum monitor unit 70 supplies the monitor control unit 52 with the results of measurement as reception monitor information.

FIG. 13 is a flowchart of a process sequence of the communication system shown in FIG. 11.

At step S40, a reception amplifier 66b of a WDM transmission device 60b receives a wavelength-multiplexed optical signal transmitted by a WDM transmission device 60a. The reception amplifier 66b amplifies the received optical signal and supplies the amplified optical signal to a spectrum monitor unit 50b via a photocoupler (not shown for the sake of simplicity).

At step S42, the spectrum monitor unit 50b measures the wavelengths, levels and OSNRs of the received optical signals, and outputs the reception monitor information to a monitor control unit 52b. At step S44, the monitor control unit 52b adds the supplied reception monitor information to the monitor control signal, which is then sent to a transmission amplifier 46b. At step S46, the transmission amplifier 46b sends the monitor control signal to the WDM transmission device 60a on the transmission side.

At step S48, a reception amplifier 66a receives the monitor control signal sent by the WDM transmission device 60b on the reception side. Then, the reception amplifier 66a supplies the received monitor control signal to a monitor control unit 52a. At step S50, the monitor control unit 52a acquires the reception monitor information concerning the WDM transmission device 60b from the supplied monitor control signal.

At step S52, the monitor control unit 52a calculates a setting value of pre-emphasis from the acquired reception monitor information. The pre-emphasis setting value is selected in accordance with the reception monitor information, as shown in part (B) of FIG. 12.

At step S54, the monitor control unit 52a supplies the pre-emphasis setting value to a spectrum monitor unit 50a. At step S56, the spectrum monitor unit 50a adjusts a variable attenuator 42a so that the optical signal can converge at the target level based on the pre-emphasis setting value supplied from the monitor control unit 52*a*.

As described above, the pre-emphasis control can automatically be carried out between the opposing WDM transmission devices 60*a* and 60*b*, so that the initial installation and operation/maintenance work can be performed efficiently.

The present invention is not limited to the specifically disclosed embodiments, and variations and modifications may be made without departing from the scope of the present invention.

The present application is based on Japanese Priority application no. 11-368470 filed on Dec. 24, 1999, the entire contents of which are hereby incorporated by reference.

What is claimed is:

1. WDM (Wavelength Division Multiplexing) transmission device comprising:
    a level adjustment unit adjusting levels of optical signals having different wavelengths;
    a multiplexer multiplexing the optical signals and outputting a multiplexed optical signal;
    an amplifier amplifying the multiplexed optical signal; and
    a monitor unit monitoring a level of the multiplexed optical signal to be applied to the amplifier and a level of an output signal of the amplifier and controlling the level adjustment unit with the levels of the multiplexed optical signals to be applied to the amplifier falling within a predetermined level range in which the amplifier operates normally, the monitor unit comprising
        a first decision unit determining whether the level of the multiplexed optical signal applied to the amplifier falls within a first target level range, and
        a second decision unit determining whether the levels of the optical signals having the different wavelengths included in the output signal of the amplifier fall within a second target level range,
        wherein the monitor unit updates the second target level if the input of the amplifier fails to fall within the first target level range.

2. The WDM transmission device as claimed in claim 1, wherein the monitor unit defines the first target level range which is included in the predetermined level range.

3. The WDM transmission device as claimed in claim 1, wherein the monitor unit defines the first target level range on the basis of an upper limit of the predetermined level range.

4. The WDM transmission device as claimed in claim 1, wherein:
    the second target level range includes target level ranges respectively associated with the optical signals of the different wavelengths; and
    the monitor unit controls the level adjustment unit so that the optical signals fall within the target levels.

5. The WDM transmission device as claimed in claim 1, wherein the monitor control unit additionally controls the level adjustment unit in accordance with levels of optical signals transmitted by another WDM transmission device.

6. A system comprising:
    a plurality of wavelength division multiplexing (WDM) transmission devices; and
    an optical fiber cable connecting the WDM transmission devices,
    each of the WDM transmission devices comprising,
        a level adjustment unit adjusting levels of optical signals having different wavelengths,
        a multiplexer multiplexing the optical signals and outputting a multiplexed optical signal,
        an amplifier amplifying the multiplexed optical signal, and
        a monitor unit monitoring a level of the multiplexed optical signal to be applied to the amplifier and a level of an output signal of the amplifier and controlling the level adjustment unit with the levels of the multiplexed optical signals to be applied to the amplifier falling within a predetermined level range in which the amplifier operates normally, the monitor unit determining whether the levels of the optical signals having the different wavelengths included in the output signal of the amplifier fall within a second target level range, determining whether the level of the multiplexed optical signal applied to the amplifier falls within a first target level range, and updating the second target level if the input of the amplifier fails to fall within the first target level range.

7. The system as claimed in claim 6, wherein the monitor control unit additionally controls the level adjustment unit in accordance with levels of optical signals transmitted by another WDM transmission device.

8. A level adjustment method for a transmission system having an amplifier and a level adjustment unit, the method comprising:
    adjusting levels of optical signals having different wavelengths;
    multiplexing the optical signals and outputting a multiplexed optical signal;
    amplifying the multiplexed optical signal; and
    monitoring a level of the multiplexed optical signal to be applied to the amplifier and a level of an output signal of the amplifier and controlling the level adjustment unit with the levels of the multiplexed optical signals to be applied to the amplifier falling within a predetermined level range in which the amplifier operates normally, said monitoring comprising
        determining whether the levels of the optical signals having the different wavelengths included in the output signal of the amplifier fall within a second target level range; range,
        determining whether the level of the multiplexed optical signal applied to the amplifier falls within a first target level range, and
        updating the second target level if the input of the amplifier fails to fall within the first target level range.

9. The method as claimed in claim 8, further comprising defining the first target level range on the basis of an upper limit of the predetermined level range.

* * * * *

UNITED STATES PATENT AND TRADEMARK OFFICE
CERTIFICATE OF CORRECTION

PATENT NO.    : 6,839,518 B1
DATED         : January 4, 2005
INVENTOR(S)   : Kazuhiro Minamimoto et al.

It is certified that error appears in the above-identified patent and that said Letters Patent is hereby corrected as shown below:

Column 9,
Line 16, before "WDM" insert -- A --

Column 10,
Line 50, delete "range;"

Signed and Sealed this

Twenty-eighth Day of June, 2005

JON W. DUDAS
*Director of the United States Patent and Trademark Office*